United States Patent
Yasui

[11] Patent Number: 5,875,581
[45] Date of Patent: *Mar. 2, 1999

[54] REEL SEAT

[75] Inventor: Toshihiko Yasui, Tondabayashi, Japan

[73] Assignee: Shimano, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 102,768

[22] Filed: Aug. 6, 1993

[30] Foreign Application Priority Data

Aug. 7, 1992 [JP] Japan .................................... 4-055615
Sep. 4, 1992 [JP] Japan .................................... 4-062361

[51] Int. Cl.$^6$ ........................... A01K 87/06; A01K 87/08
[52] U.S. Cl. ..................... 43/20; 43/22; 43/23; D22/142
[58] Field of Search .................. 43/20, 22, 23; D22/142

[56] References Cited

U.S. PATENT DOCUMENTS

| | | | |
|---|---|---|---|
| D. 321,744 | 11/1991 | Naeki et al. | D22/142 |
| D. 323,543 | 1/1992 | Oyama | D22/142 |
| D. 331,789 | 12/1992 | Onishi | D22/142 |
| 4,839,981 | 6/1989 | Yasui | 43/22 |
| 4,848,022 | 7/1989 | Ozeki et al. | 43/22 |
| 5,033,224 | 7/1991 | Wattsi | 43/22 |
| 5,088,225 | 2/1992 | Yamamoto | 43/22 |
| 5,189,824 | 3/1993 | Yamato | 43/22 |
| 5,199,207 | 4/1993 | Nakagawa | 43/22 |
| 5,291,683 | 3/1994 | Yamoto | 43/22 |
| 5,337,507 | 8/1994 | Oyama et al. | 43/23 |

FOREIGN PATENT DOCUMENTS

| | | |
|---|---|---|
| 62-160851 | 10/1987 | Japan . |
| 63-177165 | 11/1988 | Japan . |
| 64-9562 | 1/1989 | Japan . |
| 1-90359 | 6/1989 | Japan . |
| 4-35767 | 3/1992 | Japan . |
| 4-35768 | 3/1992 | Japan . |

OTHER PUBLICATIONS

Shimano, "Fresh-Saltwater", Sensilite, 1991.
Shimano, "Lead With Us", Sensilite BioGrip™, 1992.

*Primary Examiner*—Michael J. Carone
*Assistant Examiner*—Fredrick T. French, III
*Attorney, Agent, or Firm*—Knobbe, Martens Olson & Bear LLP

[57] ABSTRACT

A reel seat includes a fixed hood for engaging one end of a reel foot, a movable hood for engaging the other end of the reel foot, and a seat base extending between the two hoods and surrounding a rod core in regions of the hoods. The seat base includes a recess in at least one side thereof indented between the two hoods toward the rod core as seen in a direction perpendicular to an axis of the rod core, so that the outer edge defining the recess has a smaller width around a middle portion than portions around opposite ends in plan view.

13 Claims, 8 Drawing Sheets

REEL SEAT

BACKGROUND OF THE INVENTION

1. Field of the Invention

This invention relates to reel seats, and more particularly to a reel seat having a fixed hood for engaging one end of a reel foot, a movable hood for engaging the other end of the reel foot, and a seat base extending between the fixed hood and movable hood and completely surrounding a rod core in regions of the two hoods.

2. Description of the Related Art

A reel seat as noted above is disclosed in Japanese Utility Model Publication Kokai No. 4-35767, for example. This conventional reel seat has a seat base formed tubular and mounted on a rod core. A fixed hood is formed integral with the seat base, with a movable hood mounted to be movable axially of the rod core.

The above reel seat is mounted on a lure rod. Where the reel seat is used to attach a spinning reel, the angler holds the seat base in his or her hand, with a finger or fingers hooked on a foot of the reel. Where the reel seat is used to attach a small baitcasting reel, the angler controls the fishing rod while holding the reel seat and reel together in a mode known as palming.

With a lure rod having a relatively small diameter, the tubular seat base surrounding the rod core has the advantage of facilitating grip of the reel seat. With this structure, the angler grips the seat base which has a substantially uniform outside diameter from the fixed hood to the movable hood. Consequently, when the angler holds the fishing rod with his or her fingers hooked on the foot of a spinning reel or holds a baitcasting reel in the palming mode as noted above, the fingertips tend to slip on the seat base, thereby to hamper control of the fishing rod.

This inconvenience will be described more particularly in relation to the respective types of reels. In the case of a spinning reel, the angler holds the fishing rod with a thumb and fingers extending past the reel foot and gripping the seat base. Where the seat base has a circular outer configuration and a relatively large radius of curvature, the thumb and fingers contact and extend circuitously around side surfaces of the seat base. Consequently, the thumb and fingers tend to hold the reel foot only insufficiently. In the palming mode, the second and third fingers are passed around the seat base with the thumb placed on a thumb rest formed on an upper surface of the reel. In this way, the thumb and fingers grip the reel and seat base together. Where the seat base has a circular outer configuration and a relatively large radius of curvature, the second and third fingers tend to slip relative to the seat base. Thus, in each case, the angler must apply a strong force to the fingertips, thereby to become tired soon, while losing good control of the fishing rod.

SUMMARY OF THE INVENTION

An object of the present invention is to provide an improved reel seat which allows the angler to hold a fishing rod lightly and reliably and to control the rod with ease.

The above object is fulfilled, according to the present invention, by a reel seat comprising a fixed hood, a movable hood, and a seat base extending between the fixed hood and movable hood and completely surrounding a rod core in regions of the two hoods as noted hereinbefore, wherein the seat base includes a recess in at least one side thereof, with an outer edge thereof indented between the fixed hood and movable hood toward the rod core as seen in a direction perpendicular to an axis of the rod core, so that the outer edge defining the recess has a smaller width around a middle portion than portions around opposite ends in plan view.

This construction provides the following functions and effects.

Figure 1:
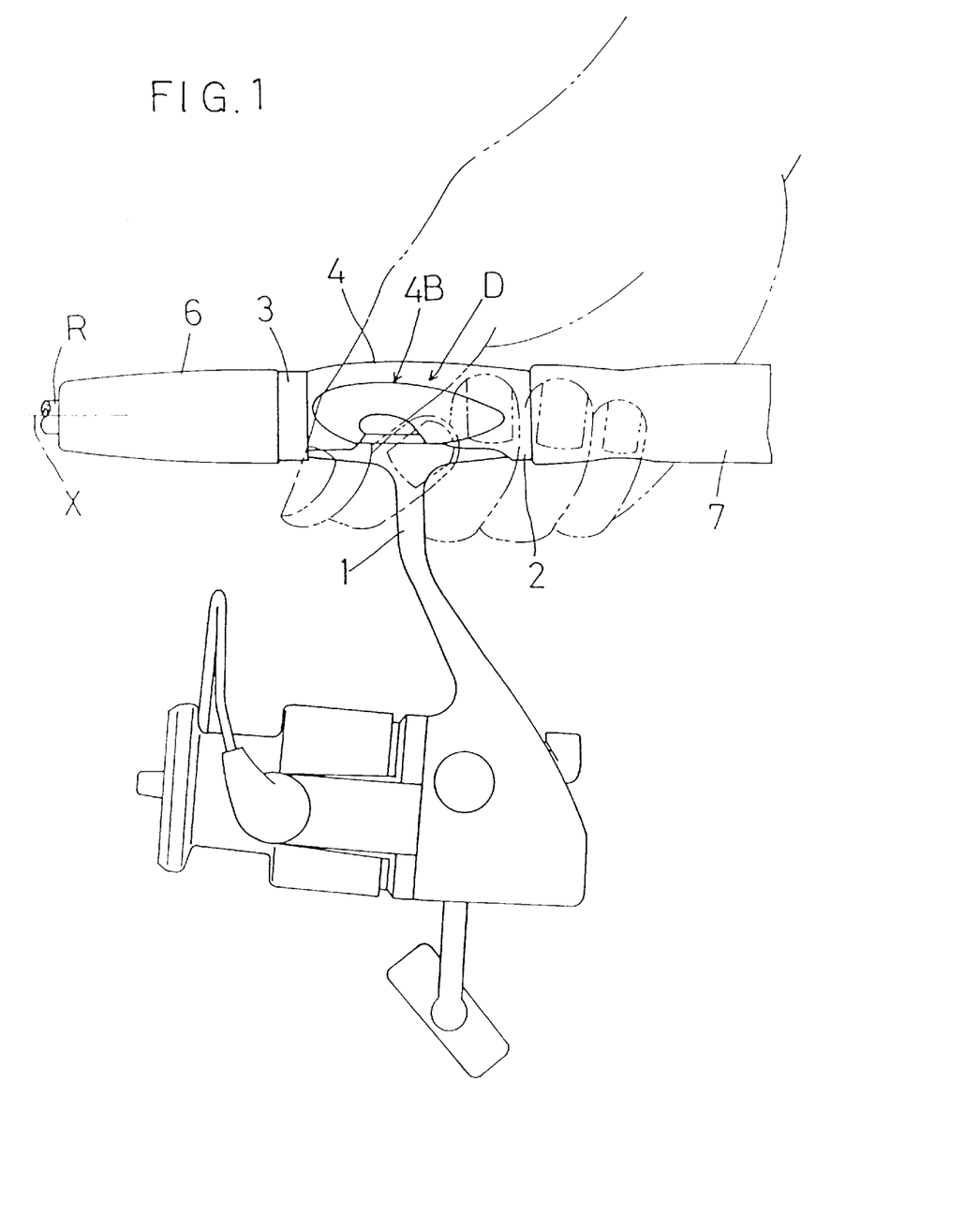
FIG. 1 is a side view of a reel seat according to the present invention, with a spinning reel attached to a fishing rod.
Figure 2:
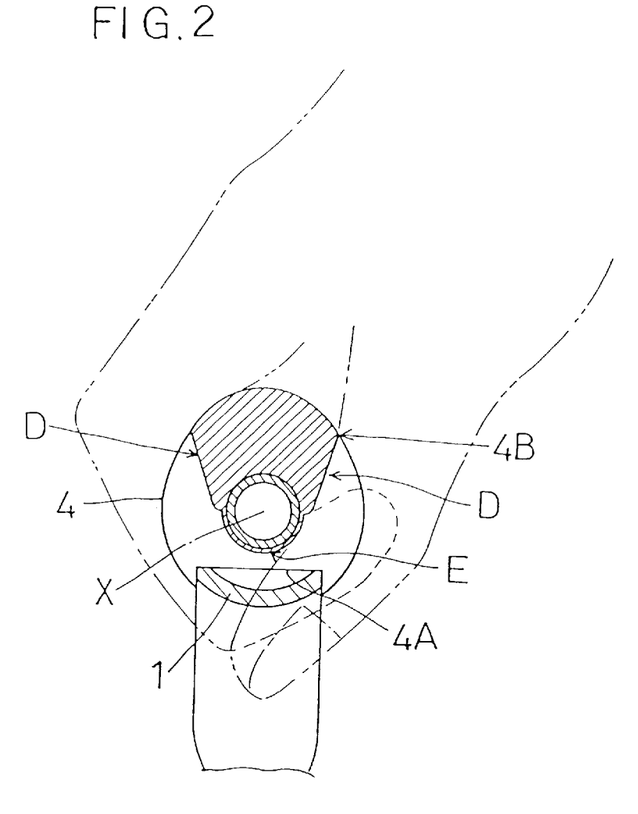
FIG. 2 is a front view in vertical section of the reel seat with the spinning reel attached.
Figure 3:
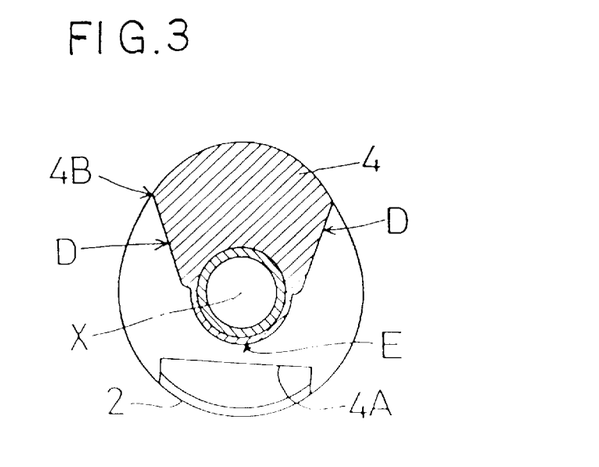
FIG. 3 is a front view in vertical section of the reel seat.
Figure 4A:
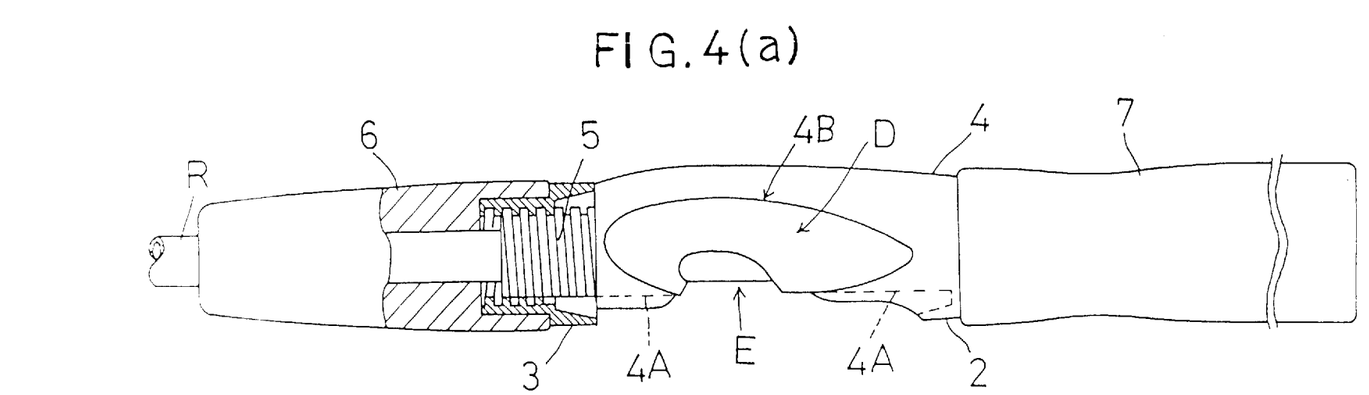
FIGS. 4(a) and (b) are a side view, partly in section, of the reel seat, and a bottom view of the reel seat, respectively.
Figure 4B:
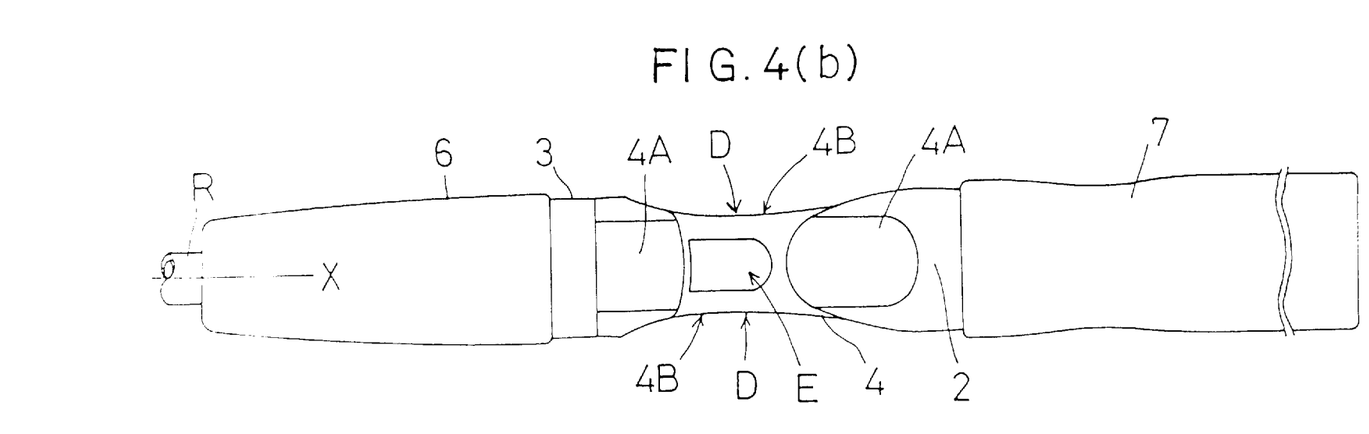

The above features may be arranged as shown in FIGS. 1 through 4, for example. As illustrated, a seat base 4 includes side recesses D indented toward a rod core R. With a spinning reel attached to the fishing rod, the angler places his or her thumb and fingers around the seat base 4. As shown in FIG. 2, the side recesses D allow the angler's thumb and fingers to extend substantially linearly from an upper surface of the seat base 4 toward a reel foot 1. This structure eliminates the inconvenience resulting from having to place the thumb and fingers circuitously around the side surfaces of the seat base as in the prior art. The angler's thumb and fingers fully reach the reel foot 1 to secure a good grip of the seat base 4 and foot 1. Fingertips or intermediate positions of the fingers may be placed on outer edges 4B of the recesses D to prevent slips of the fingers.

It should be noted that the holding position may not be necessarily the same as the condition shown in FIG. 1 since the size of the user's hand and thus the length and the thickness of his or her fingers and the thickness of the rod member vary. However, the position where the middle finger contacts the recess D may assure the angler of more stabilized grip.

Figure 8:
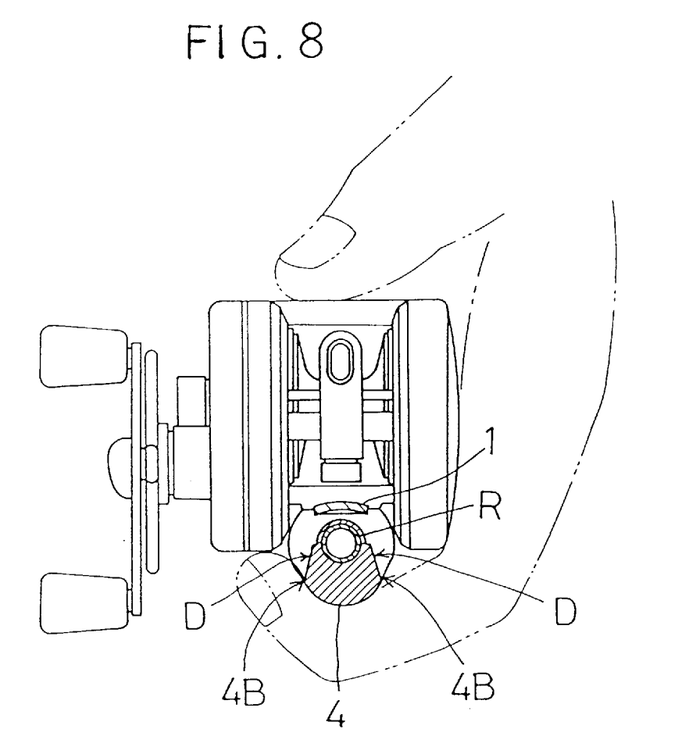
FIG. 8 is a front view in vertical section of a reel seat in a further embodiment of the invention, with a baitcasting reel attached to a fishing rod.
Figure 9:
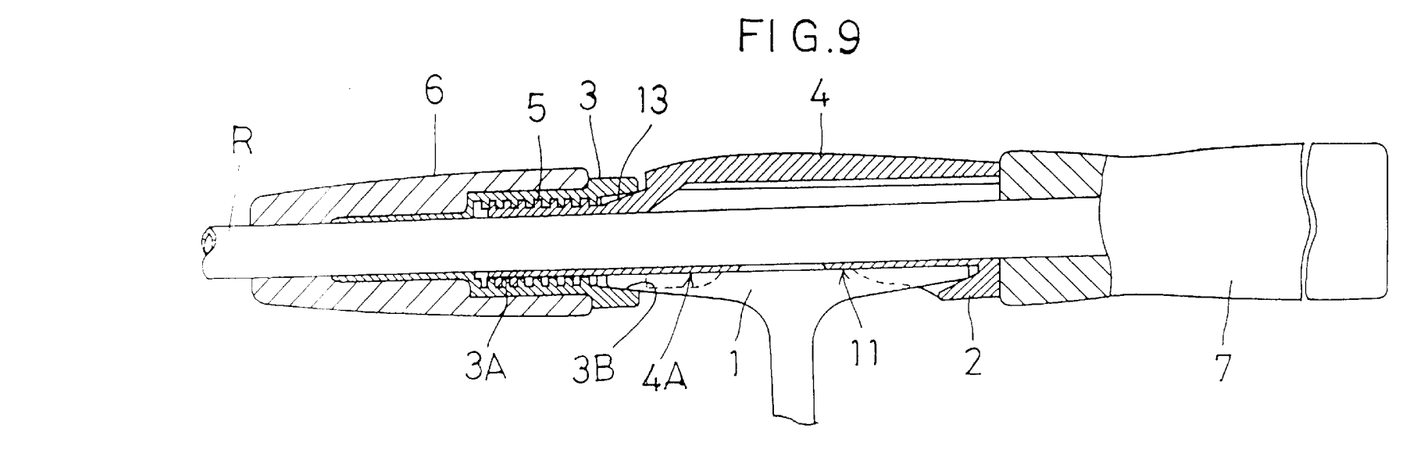
FIG. 9 is a side view in vertical section of a reel seat in a further embodiment.
Figure 10:
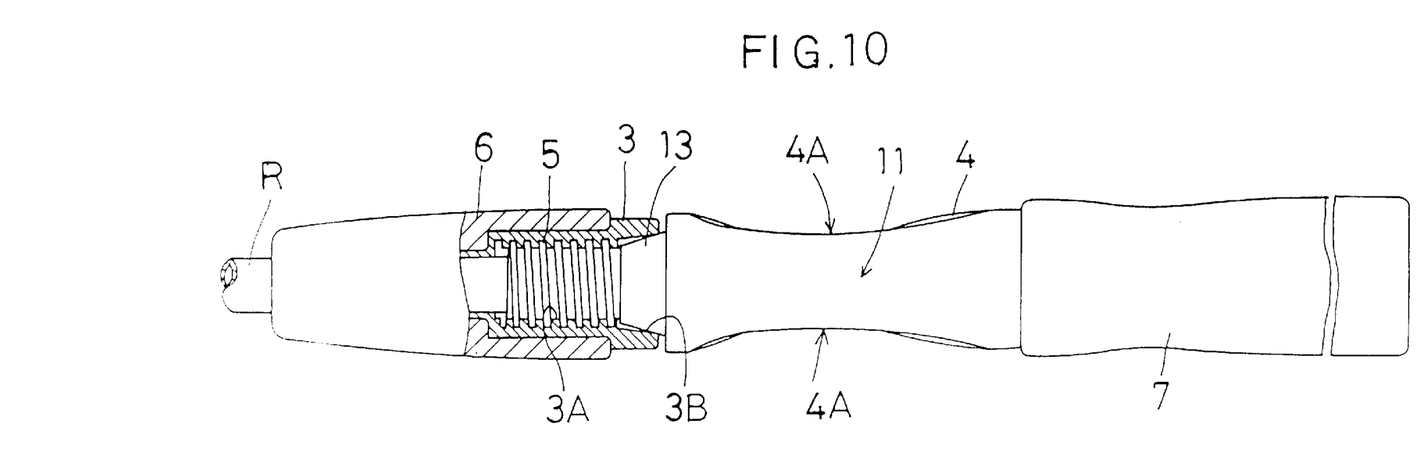
FIG. 10 is a plan view, partly in section, of the reel seat shown in FIG. 9.
Figures 11, 12:
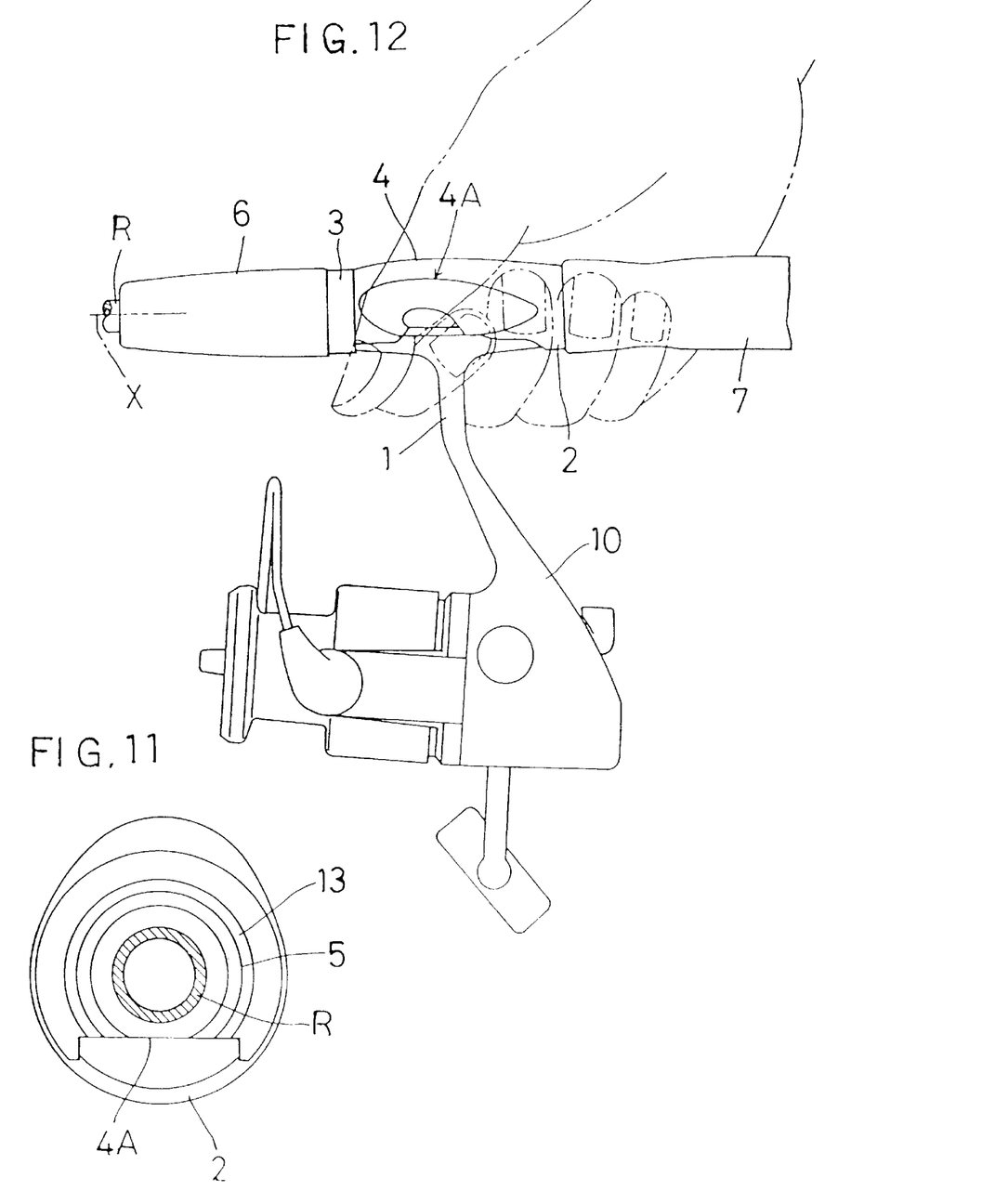
FIG. 11 is a front view in vertical section of the reel seat shown in FIG. 9.
FIG. 12 is a side view of the reel seat shown in FIG. 9, with a spinning reel attached.

When holding the rod and a baitcasting reel in the palming mode as shown in FIG. 8, fingertips may extend into one of the recesses D formed laterally of the seat base 4. Thus, the fingertips may be hooked in the recess D to check slipping of the fingertips, which was impossible with the known slippery outer configuration of the reel seat.

According to the present invention, the recesses D are formed in the sides of the seat base 4 to decrease the diameter thereof. This structure allows the angler's thumb and fingers to extend with ease and grip the recesses D. With this improved reel seat, the angler can reliably hold a fishing rod and a reel attached thereto in a light grip, and control the fishing rod with ease.

Since the recesses are formed in the seat base between the two hoods, an approximately central region of the palm gripping the rod may be placed in contact with a large diameter portion adjacent the seat base to realize a steady grip. This also allows the angler to exert a force to fingertips, thereby facilitating rod control.

The reel seat according to the present invention may be modified as follows.

The seat base may include a tapered joint portion formed at one end thereof and connecting a screw portion to the seat base. This tapered joint portion has a diameter progressively increasing toward the seat base. A position of the tapered joint portion connected to the seat base has a diameter larger than an end opening diameter of the movable hood.

This construction advantageously provides the following functions:

(a) With the tapered joint portion connecting the screw portion to the reel seat, the reel is attached without a difference in level with the screw portion. This avoids stress concentration in the connecting position.

(b) The reel foot is fixable in place by turning and advancing the movable hood. This operation is completed with a reel foot receiving surface of the movable hood contacting the reel foot, and at the same time a position of the movable hood substantially 180 degrees opposite from the reel foot receiving surface contacting the tapered joint portion. (The movable hood, whether metallic or plastic, itself has a certain degree of elasticity and produces slight chattering. Because of the elasticity, it is difficult to determine when the movable hood is fully tightened. However, completion of the tightening operation may be discerned with increased reliability by the reel foot receiving surface and the position approximately 180 degrees opposite therefrom contacting the reel foot and tapered joint portion at the same time.)

Consequently, stress produced in the end opening of the movable hood when fixing the reel foot is attributable to the reel foot and the tapered joint portion. The stress applied to each contacting part of the end opening of the movable hood, particularly bearing stress, is reduced to a half.

With the function (a) above, the tapered joint portion produces the effect of mitigating stress concentration while allowing the screw portion and the reel seat to have different diameters. It is therefore unnecessary to enlarge the screw portion to have the same outside diameter as the reel seat or to use an improved material therefor.

With the function (b), stress is applied equally to the reel foot receiving surface and the position opposite therefrom. It is therefore unnecessary to provide the end opening of the movable hood with a metallic reinforcing frame. This feature contributes toward lightness of the reel seat to facilitate rod control.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Reel seats according to the present invention will be described in detail hereinafter with reference to the drawings.

FIG. 1 shows a reel seat connecting a spinning reel to a lure rod which is one example of fishing rods. This reel seat includes a fixed hood 2 disposed in a rear position thereof for engaging one end of a reel foot 1. A movable hood 3 is disposed in a forward position of the reel seat for engaging the other end of the foot 1. The reel seat further includes a seat base 4 surrounding the entire circumference of a rod core R and extending between the hoods 2 and 3. As shown in FIGS. 1 through 4(a) and (b), the movable hood 3 is in the form of a nut meshed with a screw 5 formed on the seat base 4. A cover 6 formed of cork or the like is placed peripherally of the movable hood 3. A grip 7 formed of cork or the like is disposed rearwardly of the fixed hood 2.

The seat base 4 has an upper surface bulging in a longitudinally intermediate position thereof, and planar support portions 4A 180 degrees opposite from the upper surface for contacting and supporting the opposite ends of the reel foot 1. Opposite sides of the seat base 4 define recesses D between the hoods 2 and 3, with outer edges 4B thereof indented from the hoods 2 and 3 toward the rod core R as seen in directions perpendicular to an axis X of the rod core R. A small diameter portion E is formed between the support portions 4A, which is also indented toward the rod core R and continuous with the two recesses D.

The seat base 4 comprises a die-formed resin mounted on the rod core R and fixed in place with an adhesive. The small diameter portion E is a thin wall portion in tight contact with a periphery of the rod core R in a way to conceal the rod core R.

As shown in FIG. 2, when the angler controls the rod with the spinning reel attached thereto, the side recesses D allow his or her thumb and fingers holding the seat base 4 to extend substantially linearly from the upper surface of the seat base 4 toward the reel foot 1. Thus, the angler's thumb and fingers fully reach the foot 1 to secure a reliably grip, whereby the rod may be controlled with a light force.

Figure 5A:
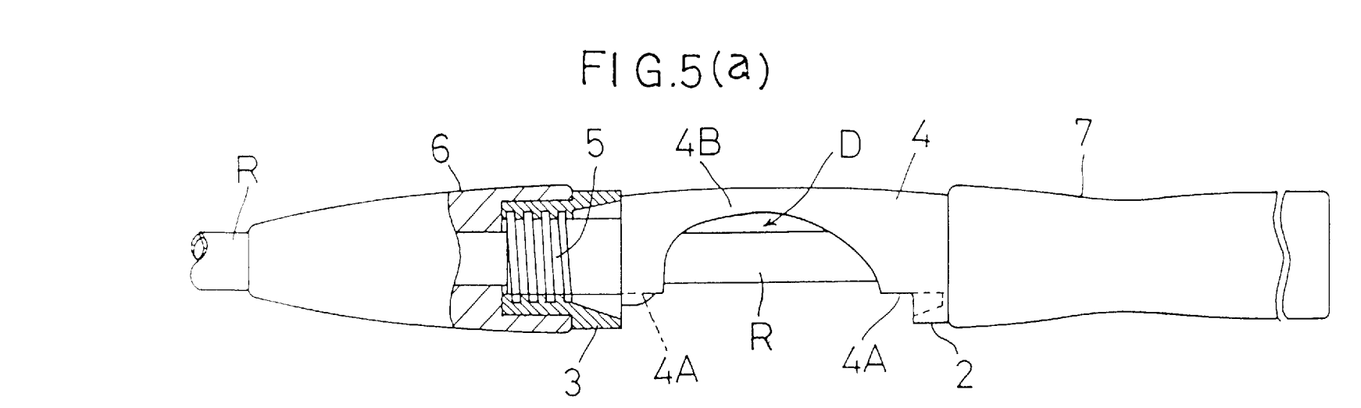
FIGS. 5(a) and (b) are a side view, partly in section, of a reel seat in another embodiment, and a bottom view of the reel seat, respectively.
Figure 5B:
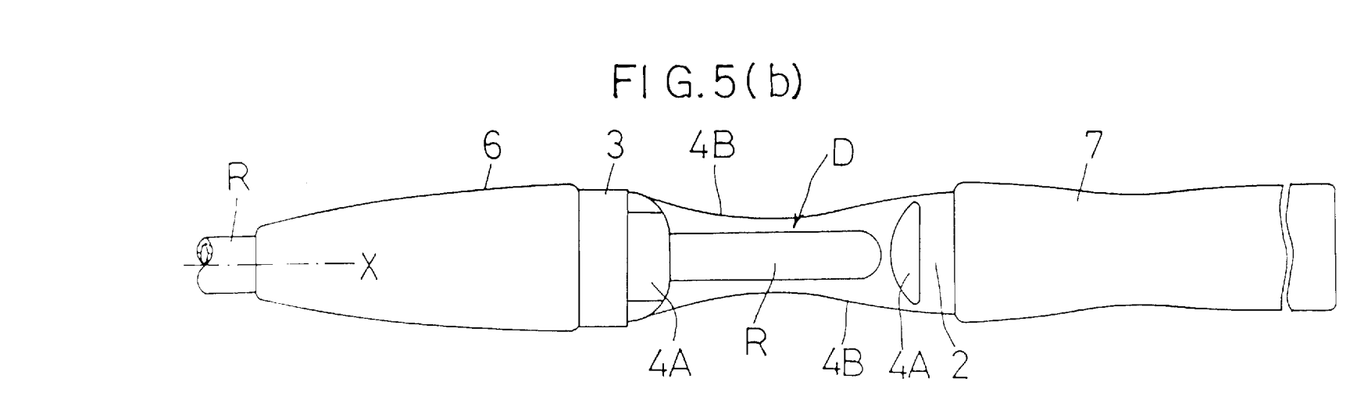
Figure 6:
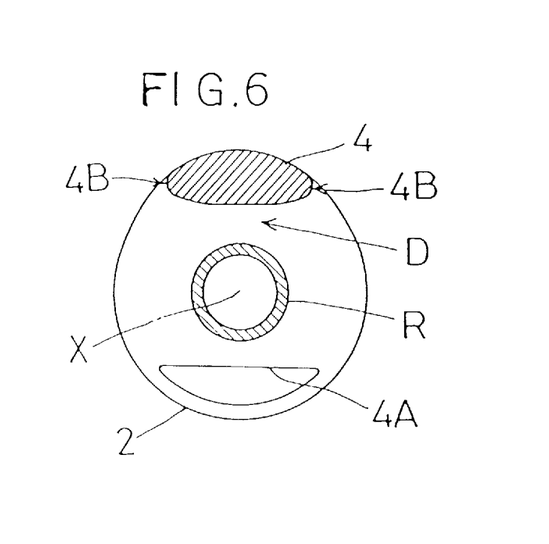
FIG. 6 is a front view in vertical section of the reel seat shown in FIG. 5.

This embodiment may be modified as follows:

(a) As shown in FIGS. 5(a) and (b) and FIG. 6, the seat base 4 may include deep side recesses D communicating with each other and exposing the rod core R.

Figure 7:
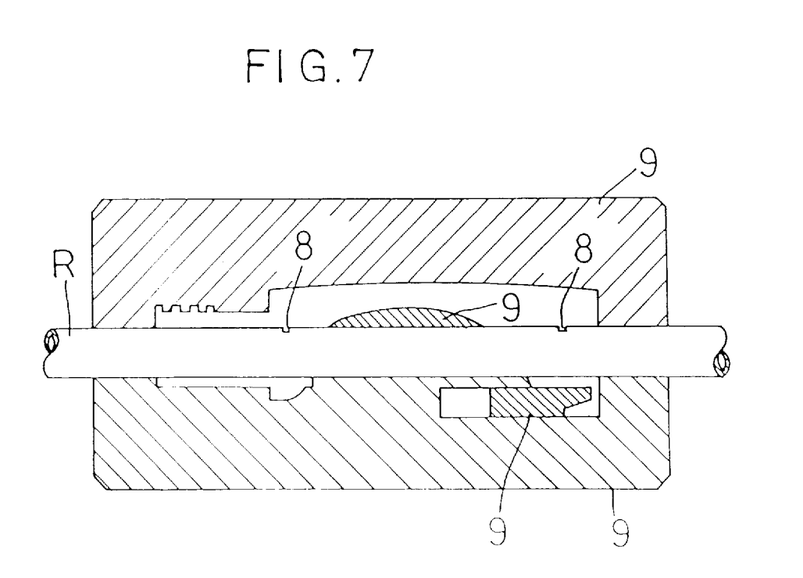
FIG. 7 is a sectional view of dies used in forming the reel seat shown in FIG. 5.

This seat base 4 is formed directly on the rod core R by injection molding. In this process, as shown in FIG. 7, rotation stopper grooves 8 are formed in the rod core R, then a plurality of dies 9 are arranged peripherally of the rod core R, and a resin is injected.

(b) As shown in FIG. 8, the invention is applicable to a reel seat adapted for attaching a baitcasting reel.

In this case, when the angler holds the rod and reel in a palming mode as illustrated, fingertips may extend into one of the recesses D formed laterally of the seat base 4. Thus, the fingertips may be hooked in the recess D to check slipping of the fingertips.

(c) The above reel seat may be formed by injection to be integral with the rod core R. The reel seat in the modification (a) above may be formed separately from the rod core R, and then bonded to the rod core R.

(d) The seat base may include a recess only in one side thereof. In this case, the side for forming the recess is selected to suit a right-handed or left-handed angler.

A further embodiment will be described next.

As shown in FIGS. 9–12, a fishing rod comprises a lure rod having a reel seat 11 mounted on a rod core R forwardly of a cork grip 7. The reel seat 11 includes a fixed hood 2 formed integral with a rear end thereof, and a movable hood 3 disposed at a forward end thereof, to attach a spinning reel 10 to the rod.

As shown in FIGS. 9 through 12, the reel seat 11 has a seat base 4 having an approximately circular section with curved side surfaces 4B extending approximately vertically. This structure with the thin portion allows the angler to grip a foot 1 of the reel 10 and the seat base 4 together with ease.

A structure associated with the movable hood 3 will be described next. The seat base 4 includes a small diameter shaft portion extending forwardly thereof and defining a male screw 5. A tapered joint portion 13 is formed rearwardly of the screw 5 to connect the screw 5 to the seat base 4 as an integral part of the latter. A planar support 4A extends along lower surfaces of the movable hood 3, seat base 4, tapered joint portion 13 and screw 5 to receive the foot 1 of the reel 10. This planar support 4A is not threaded or tapered.

The screw 5, tapered joint portion 13 and seat base 4 have the following dimensional relations. The screw 5 has a thread diameter smaller than an outside diameter of the seat base 4. The tapered joint portion 13 has a minimum diameter corresponding to a root diameter of the screw 5, which increases progressively toward the seat base 4. A portion of the tapered joint portion 13 connected to the seat base 4 has a diameter larger than an end opening diameter of the movable hood 3.

The movable hood 3 defines a female screw 3A meshed with the screw 5. A cover 6 is fixedly mounted on the movable hood 3. The movable hood 3 includes a reel receiving portion 3B defined in the end opening forwardly of the female screw 3A for fixing the foot 1 of the reel 10. The reel receiving portion 3B has a tapered surface diverging toward the end opening to accommodate a tapered configuration of the reel foot 1.

According to the above structure, when the angler turns and advances the cover 6 with the reel foot 1 placed on the support 4A, the opening of the movable hood 3 contacts the reel foot 1 and tapered joint portion 13 to fix the reel foot 1. The reel foot 1 is fixed free of chattering since the movable hood 3 contacts the reel foot 1 and the tapered joint portion 13 which is disposed 180 degrees opposite from the reel foot 1.

This embodiment may be modified as follows:
(1) The fixed hood 2 and screw 5 may be die-formed integral with each other. Alternatively, the screw 5 may be cut after forming the seat base 4 and fixed hood 2.
(2) The cover 6 may be formed of a metal, in which case the female screw 3A may be formed directly in the cover 6, thereby dispensing with the movable hood 3.
(3) The cover 6 may include a rotating element meshed with the screw 5, and a presser element slidable axially of the fishing rod to apply a pressure to the reel foot 1.

What is claimed is:

1. A reel seat comprising:
a fixed hood for engaging one end of a foot of a reel;
a movable hood for engaging the other end of said foot;
a seat base extending between said fixed hood and said movable hood and surrounding a rod core in regions of said fixed hood and said movable hood;
planar support portions formed on a bottom surface of said seat base for contacting and supporting the opposite ends of said foot;
a screw portion formed at one end of said seat base;
a tapered joint portion for connecting said seat base to said screw portion, said tapered joint portion having a diameter progressively increasing toward said seat base;
a recess formed in each side of said seat base in the form of a curvilinear recess extending from said fixed hood to said movable hood as viewed along a line perpendicular to a surface of said planar support portions; and
an outer peripheral edge of said recess having greatest depth at an intermediate position between said fixed hood and said movable hood;
wherein said seat base further includes a small diameter portion indented toward said rod core between said planar support portions and continuous with the recesses;
wherein a width of a cross section of said seat base increases away from said small diameter portion.

2. A reel seat comprising:
a fixed hood for engaging one end of a foot of a reel;
a movable hood for engaging the other end of said foot;
a seat base extending between said fixed hood and said movable hood and surrounding a rod core in regions of said fixed hood and said movable hood;
a screw portion formed at one end of said seat base;
a tapered joint portion for connecting said seat base to said screw portion, said tapered joint portion having a diameter progressively increasing toward said seat base;
a recess formed in each side of said seat base, with an outer edge thereof indented between said fixed hood and said movable hood toward said rod core as seen in a direction perpendicular to an axis of said rod core, so that the outer edge defining the recess has a smaller width than a width of a planar support portion formed on a bottom surface of said seat base, said recesses being deep in the sides of the reel seat to communicate with each other and expose said rod core over the peripheries thereof.

3. A reel seat comprising:
a fixed hood for engaging one end of a foot of a reel;
a movable hood for engaging the other end of said foot; and
a seat base extending between said fixed hood and said movable hood and surrounding a rod core in regions of said fixed hood and said movable hood; wherein
said seat base includes a recess formed in each side thereof, with an outer edge indented between said fixed hood and said movable hood toward said rod core as seen in a direction perpendicular to an axis of said rod core, so that the outer edge defining the recess has a smaller width around a middle portion than portions around opposite ends in plan view, with an upper surface of said seat base bulged in a longitudinally intermediate position thereof;
said seat base further includes planar support portions for contacting and supporting the opposite ends of said foot, and a smaller diameter portion indented toward said rod core between said support portions and continuous with the recesses;
wherein a width of a cross section of said scat base increases away from said small diameter portion.

4. A reel seat as defined in claim 3, wherein said seat base includes a tapered joint portion formed at one end thereof and connecting a screw portion to said seat base, said tapered joint portion having a diameter progressively increasing toward said seat base, a portion of said tapered joint portion connected to said seat base having a diameter larger than an end opening diameter of said movable hood.

5. A reel seat as defined in claim 3, wherein said outer edge defining the recess has a smaller width than a width of said planar support.

6. A reel seat as defined in claim 4, wherein said fixed hood is formed integral with said seat base.

7. A reel seat comprising:

a fixed hood for engaging one end of a foot of a reel;

a movable hood for engaging the other end of said foot;

a seat base extending between said fixed hood and said movable hood and surrounding a rod core in regions of said fixed hood and said movable hood;

planar support portions formed on a bottom surface of said seat base for contacting and supporting the opposite ends of said foot;

said seat base includes a recess in at least one side thereof, with an outer edge thereof indented between said fixed hood and said movable hood toward said rod core as seen in a direction perpendicular to an axis of said rod core, so that the outer edge defining the recess has a smaller width than a width of a support of the seat base supporting a reel foot; and a recess formed in at least one side face of said seat base in the form of a curvilinear recess extending from said fixed hood to said movable hood as viewed along a line perpendicular to a surface of said planar support portions;

an outer peripheral edge of said recess having greatest depth at its substantially center position;

said seat base further including a smaller diameter portion indented toward said rod core between said planar support portions and continuous with the recesses; and wherein a width of a cross section of said seat base increases away from said small diameter portion.

8. A reel seat comprising:

a fixed hood for engaging one end of a foot of a reel;

a movable hood for engaging the other end of said foot; and a seat base extending between said fixed hood and said movable hood and surrounding a rod core in regions of said fixed hood and said movable hood;

said seat base includes a recess in each side thereof, with an outer edge thereof indented between said fixed hood and said movable hood toward said rod core as seen in a direction perpendicular to an axis of said rod core, so that the outer edge defining the recess has a smaller width around a middle portion than portions around opposite ends in plan view, with an upper surface of said seat base bulged in a longitudinally intermediate portion thereof;

said seat base further includes planar support portions for contacting and supporting the opposite ends of said foot, and a smaller diameter portion indented toward said rod core between said support portions and continuous with the recesses; and wherein a width of a cross section of said seat base increases away from said small diameter portion.

9. A reel seat as defined in claim 1, wherein said width of said cross section of said seat base increases linearly away from said small diameter portion.

10. A reel seat as defined in claim 3, wherein said width of said c ross section of said seat base increases linearly away from said small diameter portion.

11. A reel seat as defined in claim 7, wherein said width of said cross section of said seat base increases linearly away from said small diameter portion.

12. A reel seat as defined in claim 8, wherein said width of said cross section of said seat base increases linearly away from said small diameter portion.

13. A reel seat as defined in claim 2, wherein said recess has said smaller width away from said movable hood.

* * * * *